No. 896,993. PATENTED AUG. 25, 1908.
L. JANISCH.
CONTROL SYSTEM FOR MOTOR DRIVEN RECIPROCATING DEVICES.
APPLICATION FILED DEC. 14, 1907.

4 SHEETS—SHEET 1.

WITNESSES:
Lester H. Palmer
J. Ellis Glen

INVENTOR
LEOPOLD JANISCH.
BY Albert G. Davis
ATT'Y.

No. 896,993.

PATENTED AUG. 25, 1908.

L. JANISCH.
CONTROL SYSTEM FOR MOTOR DRIVEN RECIPROCATING DEVICES.
APPLICATION FILED DEC. 14, 1907.

4 SHEETS—SHEET 2.

WITNESSES:
Lester H. Fulmer.
J. Ellis Glen

INVENTOR
LEOPOLD JANISCH.
BY Allen A. M. Davis
ATT'Y.

THE NORRIS PETERS CO., WASHINGTON, D. C.

No. 896,993.
PATENTED AUG. 25, 1908.
L. JANISCH.
CONTROL SYSTEM FOR MOTOR DRIVEN RECIPROCATING DEVICES.
APPLICATION FILED DEC. 14, 1907.
4 SHEETS—SHEET 3.
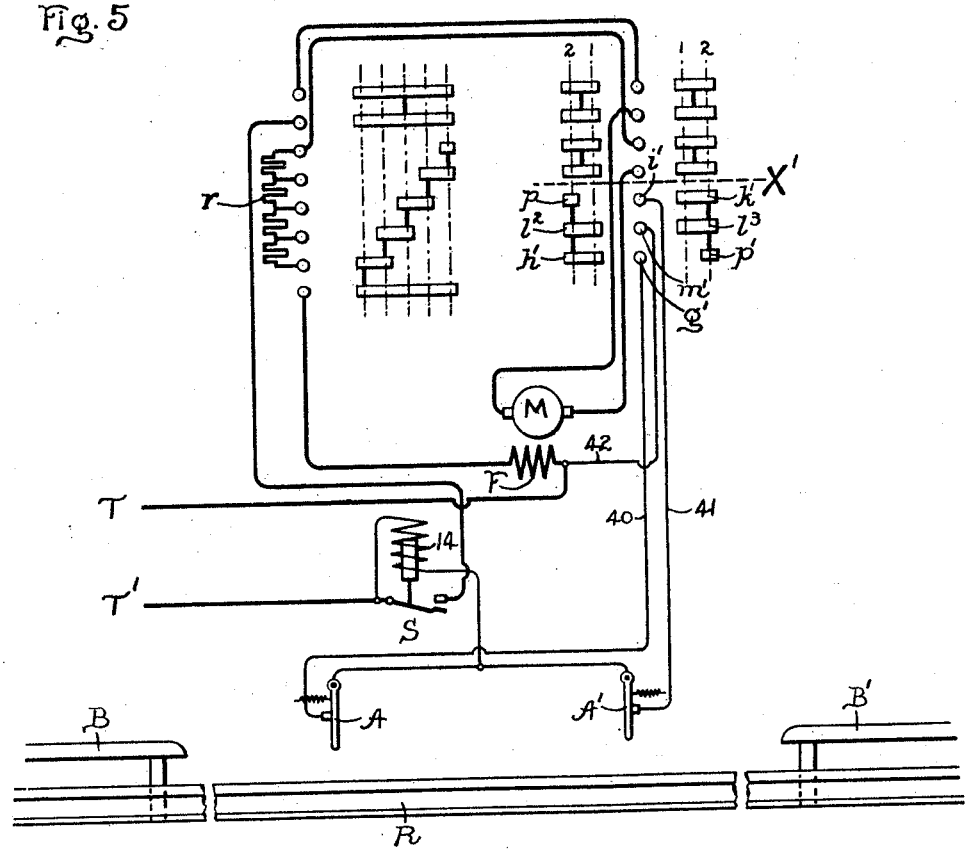
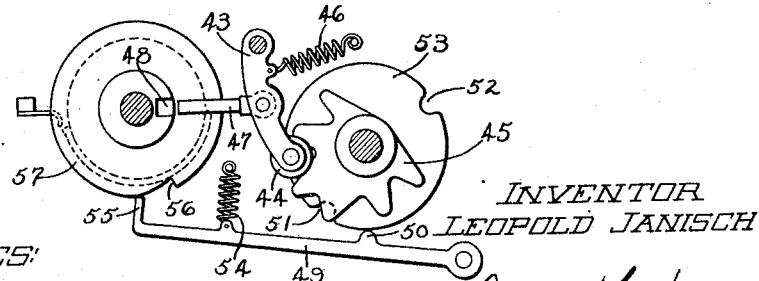
INVENTOR
LEOPOLD JANISCH
WITNESSES:
BY
ATTY.

No. 896,993. PATENTED AUG. 25, 1908.
L. JANISCH.
CONTROL SYSTEM FOR MOTOR DRIVEN RECIPROCATING DEVICES.
APPLICATION FILED DEC. 14, 1907.

4 SHEETS—SHEET 4.

WITNESSES:
Lester D. Fulmer.
J. Ellis Glen.

INVENTOR
LEOPOLD JANISCH.
BY Albert G. Davis
ATT'Y.

UNITED STATES PATENT OFFICE.

LEOPOLD JANISCH, OF BERLIN, GERMANY, ASSIGNOR TO GENERAL ELECTRIC COMPANY, A CORPORATION OF NEW YORK.

CONTROL SYSTEM FOR MOTOR-DRIVEN RECIPROCATING DEVICES.

No. 896,993.  Specification of Letters Patent.  Patented Aug. 25, 1908.

Application filed December 14, 1907. Serial No. 406,460.

*To all whom it may concern:*

Be it known that I, LEOPOLD JANISCH, a subject of the Emperor of Germany, residing at Berlin, Germany, have invented certain new and useful Improvements in Control Systems for Motor-Driven Reciprocating Devices, of which the following is a specification.

My invention relates to the control of electric motors and particularly to the control of such motors when they are used for driving reciprocating mechanisms, such as hoists, traveling cranes, conveyers, draw-bridges, transfer tables, turn-tables, and the like.

The principal object of my invention is to provide means whereby the operation of the reciprocating mechanism beyond a certain point in its path of travel, usually near the end thereof, at any but a slow speed is prevented.

In another aspect, an object of my invention is to permit operation of the reciprocating mechanism beyond the points at which the limiting devices operate,—said continued operation, however, being confined to slow speed.

The system of control by which I attain the above objects will be understood from the following description taken in connection with the accompanying drawings, in which I have described and illustrated several forms of my invention. These arrangements are, however, merely illustrative of my invention, and I wish it understood that I realize that they may be modified in many respects without departing from the general principles thereof.

Figure 1:
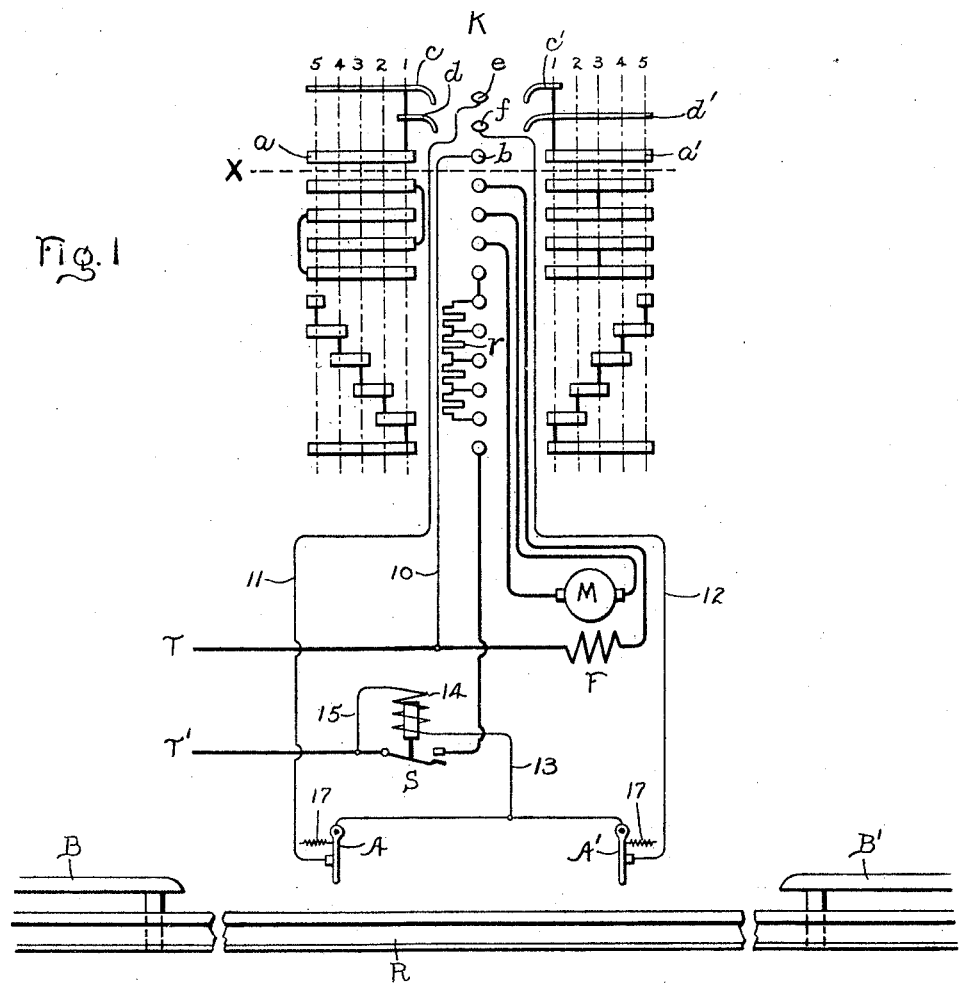
Figure 2:
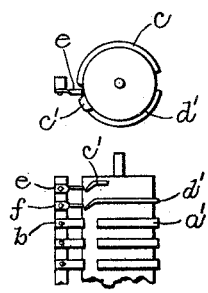
Figure 3:
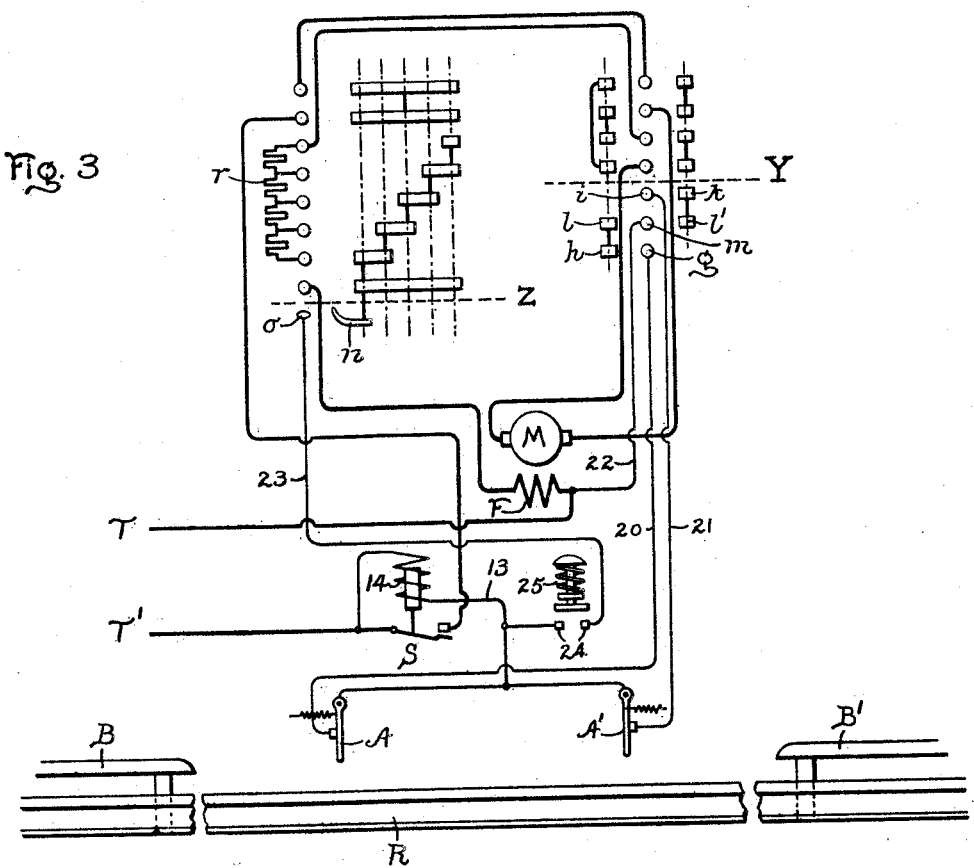
Figure 4:
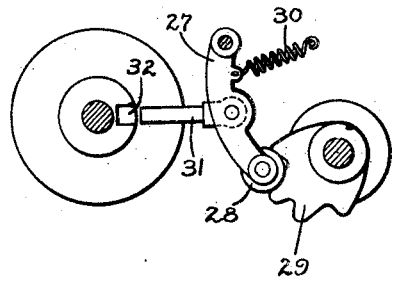
Figure 7:
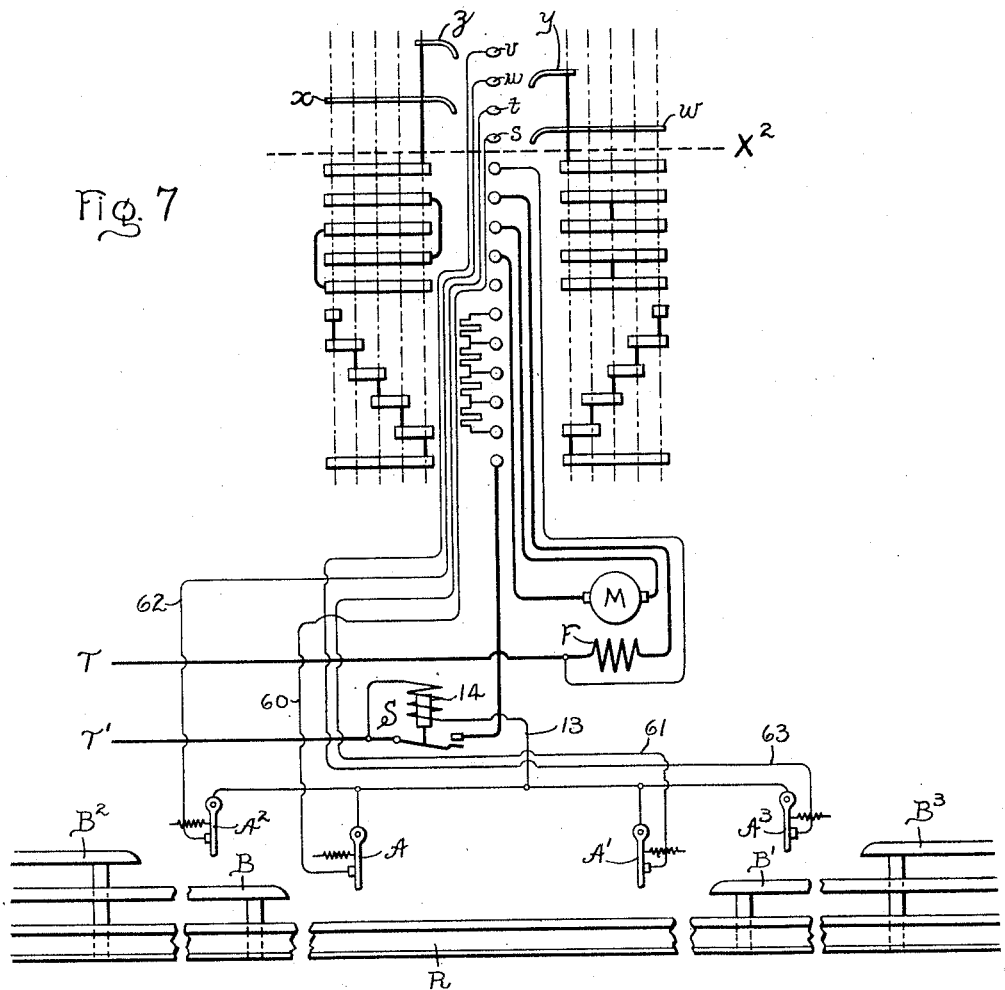

Referring to the drawings, Figure 1 illustrates diagrammatically a control system for a reciprocating mechanism arranged according to my invention; Fig. 2 is a detail view showing the form of contacts used on the drum of the controller illustrated in Fig. 1; Fig. 3 illustrates diagrammatically a modified form of my invention; Fig. 4 shows a way in which the main and reversing cylinders of the controller illustrated in Fig. 3 may be interlocked; Fig. 5 illustrates diagrammatically another form in which my invention may be embodied; Fig. 6 shows interlocking devices suitable for use in the controller illustrated in Fig. 5; and Fig. 7 illustrates diagrammatically still another form of my invention.

Like parts are referred to throughout all the figures by the same reference characters.

In Figs. 1, 3, 5 and 7, while the reciprocating mechanism itself has not been shown, the armature M and field F of the driving motor are diagrammatically illustrated and the controller and control circuits therefor are shown in a well known conventional manner. In each of these figures the rail or rails upon which the reciprocating mechanism is supposed to run is shown at R, and projecting slightly above said rail or rails are shown cam bars which engage with and open certain limit switches as the reciprocating mechanism which carries them brings said switches into contact with said cam bars in a manner hereinafter described. In each of said figures an electromagnetically operated switch S is illustrated as serving to close and open the main motor circuit. This switch may be of any suitable and well known construction. In each modification also the controller is shown as serving directly to cut out resistance in the motor circuit and to make the necessary motor connections for both directions of operation, but it is obvious that these operations might equally well be performed by separately actuated contacts of electric, pneumatic, or other type, operated from a master-controller. It is, of course, equally obvious that instead of a single motor a plurality might be used and the series-parallel system of control employed. In each of the above named figures the source of current supply is indicated at T and T¹.

Referring now particularly to Fig. 1, the driving motor for the reciprocating mechanism is shown as adapted to be regulated as to its speed and direction of rotation by the controller K having a single drum arranged to be rotated in both directions from its off position to bring either of two sets of segments into engagement with certain fixed contact fingers, the movement of the drum in one direction causing the motor to rotate one way, and movement of the drum in the other direction from off position causing reverse rotation of the motor. The controller is shown in its off position with one group of segments on one side of the fixed contact fingers and the other group on the other side. The segments and fingers shown below the line X serve in a well known manner to make the proper motor connections for either direction of rotation and to cut the resistance $r$ out of the motor circuit step-by-step as the drum is rotated. As has been stated above, the electromagnetic switch S serves to make and break the connection of the motor with the source of current supply, and the operation of this switch is controlled by the segments and fingers on the controller above the line X working in connection with the limit switches A and $A^1$, as will now be described. In the left-hand group of segments on the drum of the controller K, the segment $a$ by engaging with the finger $b$ when the drum is turned will connect segments $c$ and $d$ with the source T, the finger $b$ being connected to said source through a wire 10. In the right-hand group of segments the segment $a^1$ by engaging with the finger $b$ will connect segments $c^1$ and $d^1$ with the source T. The segments $c$ and $c^1$ engage with the finger $e$, and the segments $d$ and $d^1$ engage with a finger $f$. The segments $c^1$ and $d^1$ and the fingers $e$ and $f$ are so made that when the drum is rotated and these fingers and segments engage, the fingers will yield and ride up on the top of the corresponding segments so that after the drum has been moved so far in one direction that the finger $e$ ceases to engage the segment $c^1$ or finger $f$ ceases to engage segment $d$, said fingers will then spring downward and can only be made to again engage said segments by turning the controller back through its off to its first position again. Segments $c$ and $d^1$ are made similar in form to segments $c^1$ and $d$ in order that the fingers $e$ and $f$ may engage with them also, but these fingers $c^1$ and $d$ stand over the full extent of movement of the drum in either direction. The construction of these segments and fingers is more clearly shown in Fig. 2. The fingers $e$ and $f$ are connected respectively in parallel through wires 11 and 12 and the limit switches A and $A^1$, to the wire 13 leading to one end of the actuating coil 14 of the electromagnetic switch S. The other end of said coil 14 is connected through the wire 15 to the terminal $T^1$. The limit-switches A and $A^1$ are shown biased to their closed position by springs 17, and cam bars B and $B^1$ are shown fixed to the track and so arranged in the path of said switches that when the reciprocating mechanism moves to the left of a certain point the switch A will be opened by the bar B, and when the reciprocating mechanism moves in the opposite direction switch $A^1$ will be opened by engagement with the bar $B^1$.

The operation of my device is as follows: If, while the reciprocating mechanism is in such a position that the limit switches A and $A^1$ are closed, as shown in Fig. 1, the controller is moved in either direction to its first running position the coil 14 of the electromagnetic switch S, which is connected on one side to the source $T^1$ through wire 15, is on the other side connected through wire 13, in parallel through switch A, wire 11, finger $e$, segments $c$ or $c^1$ and switch $A^1$, wire 12, finger $f$, segments $d$ or $d^1$, through segments $a$ or $a^1$ to finger $b$, and through wire 10 to the source T. The switch S is therefore closed and the motor circuit is closed through all of the resistance $r$ for one direction of rotation or the other. Said motor circuit may be easily traced on the drawing it being clear that rotation of the controller in one direction causes current to flow through the armature M of the motor in one direction, while rotation of the controller in the opposite direction produces a reverse current in the motor armature, the direction of current in the field coil F of the motor being always the same. Since in the first position of the controller all the resistance $r$ is in circuit, the speed of the motor, and therefore that of the reciprocating mechanism, will be low. If when so operating the reciprocating mechanism approaches so nearly one or the other of its extremes of travel that the limit-switch A or $A^1$ engages with the cam-bar B or $B^1$ and is thereby opened, the circuit through the actuating coil 14 of the switch S will still be maintained through the other limit-switch and the operation of the motor will not be interrupted. Supposing, however, that the controller has been moved in one direction or the other, say toward the right beyond the first speed position, and assuming also that the movement of the controller in this direction causes the reciprocating device to travel towards the left: under this condition the coil 14 of the electromagnetic switch S is maintained energized altogether through the circuit which passes through limit-switch A, since finger $f$ has ceased to engage segment $d$. If, while operating in this way, the reciprocating mechanism moves so far to the left that the switch A is opened by engagement with the bar B, the circuit through the coil 14 is broken and the switch S drops thereby opening the motor circuit and stopping the reciprocating mechanism. In order to proceed in the same direction beyond this point it is necessary for the operator to bring his controller back to off position and then forward to the first speed position for the same direction of rotation as before. The fingers $e$ and $f$ will then engage, respectively, with the segments $c$ and $d$ and the circuit through the coil 14 will be restored through the parallel circuit in which is located the limit-switch $A^1$ which has remained closed. The switch S is therefore again closed and the motor set in rotation, and the reciprocating mechanism again moves onward at a slow speed in the same direction as before. It will be impossible for the operator to increase the speed under these conditions, since if he turns his controller beyond the first speed position the circuit through the coil 14 will be interrupted and the switch S will open thereby interrupting the motor circuit.

In Fig. 3 is shown another form in which my invention may be embodied. In this arrangement the controller is provided with two cylinders, one of which serves to connect the motor circuits to the source and to vary the speed of the motor by cutting out the resistance in its armature circuit, while the other serves as a reversing switch for changing the direction of rotation of the motor by reversing the direction of the current through its armature. Controllers of this general type are well known. The reversing drum is shown at the right of the controller, and the contacts thereon above the line Y serve to connect up the armature for different directions of rotation in a manner which will be clear from the diagram to anyone skilled in this art. The contacts of the other drum which serves to vary the speed of the motor by cutting the resistance $r$ out of its circuit step-by-step and which also connects the motor circuits to the source of current supply are shown above the line Z as arranged in a well known manner for accomplishing these purposes. In this embodiment of my invention the limit-switch A is connected through a wire 20 to a finger $g$ arranged to engage with the segment $h$ on the reversing drum in line with one group of contacts, and switch $A^1$ is connected through a wire 21 to a finger $i$ arranged to engage with a segment $k$ also on the reversing drum but in line with the other group of segments. Segment $h$ is connected to a segment $l$ and segment $k$ is connected to a segment $l^1$, and these segments $l$ and $l^1$ engage with the finger $m$ which is connected through a wire 22 to the source T. With this arrangement when the reversing switch is thrown in one direction the fixed contact of the switch A is connected to the source T, and when it is thrown in the other direction the fixed contact of switch $A^1$ is connected to the source T. These connections are so made that when the reverser is thrown to cause rotation of the motor, and therefore movement of the reciprocating device in a certain direction, the limit-switch A or $A^1$, which is operated by the movement of the reciprocating device in that direction, is connected in circuit. It is evident, therefore, that if when the reverser switch is thrown the reciprocating device is in such a position that both of the limit-switches A and $A^1$ are closed, a circuit through the coil 14 of the electromagnetic switch S will be completed and this switch will be closed. The motor may then be started and its speed increased step-by-step by rotating the main drum of the controller shown at the left. In order to permit the operation of the device at a reduced speed after the limit-switch A or $A^1$ has opened, I provide on the main controller drum a segment $n$ similar to the segments $c$, $c^1$, $d$ and $d^1$, shown in Figs. 1 and 2, and for engagement with this a finger $o$, similar to fingers $e$ and $f$ of Figs. 1 and 2. The segment $n$ extends only over the first position of the controller drum and contact will be made between it and the finger $o$ therefore only in the first position of the controller. The finger $o$ is connected, through a wire 23 and contacts 24 adapted to be connected by a push-button 25, with the wire 13 which goes to one side of the actuating coil 14. The segment $n$ on the drum is connected to a segment which carries current for the main motor circuit. The two drums of the controller are mechanically interlocked in any suitable and well known manner, or as illustrated in Fig. 4, in which a lever 27 carries a roller 28 which engages with the notches of a star-wheel 29 carried by the shaft of the reversing drum, said lever being yieldingly held in engagement with the star-wheel by a spring 30. A pin 31 connected to the lever is arranged to enter a hole 32 in the hub of the main controller drum when this drum is in its off position. Devices of this kind are well known and serve to prevent the operation of the reversing cylinder except when the main drum is in its off position, and also serve to lock the main drum against movement while the reverser is in its neutral position. The operation of this arrangement will be obvious without a detailed description thereof. If when one of the limit-switches A or $A^1$ is opened by the engagement with the bar B or $B^1$ the controller is in its first position, it is only necessary for the operator to press the button 25 in order to maintain a circuit through the coil 14 and thereby keep the switch S closed and allow the reciprocating device to proceed at the same low speed. If, however, when the switch A or $A^1$ opens the controller is in a higher speed position the circuit through the coil 14 will be interrupted and cannot be restored until the operator has returned his controller to the off position and then to the first position and has pressed the button 25. The arrangement shown in Fig. 3, therefore, accomplishes the same results as that shown in Fig. 1.

In Fig. 5 is shown still another system for accomplishing the same result. With this arrangement the reverser has two positions in each direction, in the first accomplishing exactly what is done by the reverser in Fig. 3, while in the second position, in addition to the circuits made in its first position, it connects to the source T the fixed contact of the switch A or $A^1$ which was not so connected in the first position. Mechanical interlocks are provided which, in addition to preventing the operation of the reverser while the main cylinder is in any but an off position and movement of the main cylinder while the reverser is in its neutral position, also prevents the main cylinder from being turned beyond its first speed position while the reverser is in either of its second positions.

Referring to Fig. 5, the main controller drum at the left is of a usual form and serves to connect the motor circuits to the source and to cut out the resistance $r$ step-by-step. The contacts on the reverser shown above the line $X^1$ serve, as do the contacts above the line Y in Fig. 3, to change the connections to the motor armature M for the purpose of reversing the direction of rotation of the motor. Below the line $X^1$ on the reverser are a finger $g^1$ connected by a wire 40 with the fixed contact of the switch A, a finger $i^1$ connected by a wire 41 with the fixed contact of the switch $A^1$, and a finger $m^1$ connected by a wire 42 to the source T. In the first position of the reverser when moved in one direction the fingers $m^1$ and $g^1$ are connected by bridging segments $h^1$ and $l^2$, and when moved in the other direction the fingers $m^1$ and $i^1$ are connected by bridging segments $l^3$ and $k^1$. In the second position of the reverser in one direction the fingers $g^1$, $m^1$, $i^1$ are connected by segments $h^1$, $l^2$, $p$, and in the other direction by segments $p^1$, $l^3$, $k^1$.

The interlocking devices for the cylinders of the controller shown in Fig. 5 are illustrated in Fig. 6. These comprise a lever 43 having at its end a roller 44 held in yielding engagement with the star-wheel 45 by a spring 46. As in the device shown in Fig. 4, the lever 43 carries a pin 47 which enters a hole 48 in the hub of the main cylinder and the star-wheel is so designed that the reverser cannot be turned except when the pin 47 is permitted to enter the hole 48, which is only possible when the main drum is in its off position. When the reverser is in its neutral position the main drum is locked from movement as in the case of the device shown in Fig. 4. In order to prevent the main controller drum from being turned beyond its first position when the reverser is in its second position, a lever 49 is so arranged that when the reverser is in either of its second positions the lug 50 on said lever will be permitted to enter notches 51 or 52 in the circumference of a disk 53 mounted on the reverser shaft, thereby allowing the lever 49 to be moved by the spring 54 and the end 55 of said lever to engage a notch 56 in the circumference of a disk 57 mounted on the shaft of the main controller drum. This notch 56 is so arranged that when it and the end 55 of the lever 49 engage the main drum will have turned only to its first position.

The operation of the system of control shown in Fig. 5 will be apparent from the foregoing description. If while the reciprocating mechanism is moving in one direction or the other, with the reverser in its first position, the switch A or $A^1$ corresponding to that direction of movement is opened, it will be necessary for the operator, before the reciprocating device can proceed further, to throw the main drum to the off position, turn the reverser to its second position and then throw the main drum to its first speed position beyond which he cannot go owing to the mechanical interlock above described. If it happens that the operator is regularly operating the reciprocating mechanism with the reverser in its second position he cannot owing to the interlock, turn his main drum beyond the first speed position, and even if one of the switches A or $A^1$ opens under this condition it will produce no effect on the operation of the device which will continue to move onward at the same slow speed.

In the systems shown in Figs. 1, 3 and 5 and described above no means has been mentioned for stopping the reciprocating mechanism at the extreme limits of its movement. With many forms of apparatus it is sufficient to provide bumpers at each end of the track, since the speed of the device when it strikes them is so low that no harm to the apparatus can result. It may occur, however, that with very heavy reciprocating devices such a manner of stopping them at their ultimate limits of movement would be impracticable and I have shown in Fig. 7 a system adapted for such service. The system shown is very similar to that illustrated in Fig. 1 and differs therefrom mainly in the fact that two additional limit-switches are used, these being arranged to be opened after the other limit-switches and serving to finally interrupt the current through the actuating coil of the electromagnetic switch. Referring to Fig. 7 the controller has a single drum and is provided with contacts below the line $X^2$ arranged the same as the contacts below the line X in Fig. 1, and the motor circuits are the same as in that figure. In addition to the limit-switches A and $A^1$ I here provide limit-switches $A^2$ and $A^3$ which, respectively, engage cam bars $B^2$ and $B^3$ by which they are opened when the reciprocating device has reached nearly the extreme limit of its travel, the idea being that the switch A or $A^1$ first opens, thereafter limiting the speed of the device, and after the reciprocating mechanism has proceeded somewhat farther the switch $A^2$ or $A^3$ opens and prevents further movement in that direction altogether. The movable members of all four limit-switches, A, $A^1$, $A^2$ and $A^3$, are connected to the wire 13 which leads to one end of the actuating coil 14 of the electromagnetic switch S, as in the figures heretofore described, and the fixed contacts of these switches A, $A^1$, $A^2$ and $A^3$ are connected, respectively, by wires 60, 61, 62 and 63 with fingers $s$, $t$, $u$, and $v$ on the controller. These fingers $s$, $t$, $u$ and $v$ are similar in form to the fingers $e$ and $f$ of Figs. 1 and 2, and engage respectively with segments $w$, $x$, $y$ and $z$ similar to segments $c$, $c^1$, $d$ and $d^1$ of Figs. 1 and 2.

The operation of the control system shown in Fig. 7 is the same, as far as the handling of the controller goes, as that of the system of Fig. 1. Supposing the controller to have been moved to the right to produce movement of the reciprocating device toward the left: Then in all positions of the controller the circuit through the actuating coil of the electromagnetic switch S will be maintained through the switch A as long as this switch remains closed. After this switch A has opened, the circuit through the actuating coil of the switch S can be remade through the switch A² by turning the controller from its "off" to its first position, but after switch A² has opened the circuit through the actuating coil is interrupted and cannot be restored while the controller is operated for that direction of movement. The reciprocating device is, therefore, absolutely prevented from continuing its movement after the switch A² has opened. Of course by reverse movement of the controller the switch S may be closed through limit-switches A¹ and A³, and the reciprocating device caused to move in the opposite direction.

What I claim as new, and desire to secure by Letters Patent of the United States, is,—

1. In an electrically driven reciprocating mechanism, a driving motor, a controller for regulating the speed and direction of rotation thereof, and means operative when the reciprocating mechanism has moved to a certain point in either direction for preventing the motor from thereafter in that direction being operated at a speed in excess of a certain speed which is slow in comparison with the speed at which it may be run before it reaches that point.

2. In an electrically driven reciprocating mechanism, a driving motor, a controller for regulating the speed and direction of rotation thereof, and means operative when the reciprocating mechanism has been moved to a certain point in either direction for opening the motor circuit if the controller is moved beyond a certain slow-speed position for the same direction of operation.

3. In an electrically driven reciprocating mechanism, a driving motor, a controller for regulating the speed and direction of rotation thereof, means for interrupting the circuit through the motor if when the reciprocating mechanism approaches either limit of its path of travel its speed exceeds a certain value, and means for permitting operation of the motor to drive the reciprocating device beyond the point of interruption but at a slower speed only.

4. In an electrically driven reciprocating mechanism, a driving motor, a controller for regulating the speed and direction of rotation thereof, means for interrupting the circuit through the motor if when the reciprocating mechanism approaches either limit of its path of travel its speed exceeds a certain value, and means for thereafter restoring the motor circuit operative only when the controller is in a slow-speed position.

5. In an electrically driven reciprocating mechanism, a driving motor, a controller for regulating the speed and direction of rotation thereof, devices for interrupting the circuit through the motor if when the reciprocating mechanism approaches the limit of its movement in either direction the controller is beyond a certain slow-speed position, and means coöperating with either interrupting device and operative only when the controller is in said slow-speed position for restoring the motor circuit after the other interrupting device has caused it to be interrupted.

6. In an electrically driven reciprocating mechanism, a driving motor, a controller for regulating the speed and direction of rotation thereof, limit-switches for causing the circuit through the motor to be interrupted if when the reciprocating device approaches either limit of its path of travel the controller is beyond a certain slow-speed position, and means coöperating with either limit-switch and operative only when the controller is in said slow-speed position for restoring the motor circuit after it has been interrupted by the operation of the other limit-switch.

7. In an electrically driven reciprocating mechanism, a driving motor, a controller for regulating the speed and direction of rotation thereof, limit-switches for causing the circuit through the motor to be interrupted if when the reciprocating mechanism approaches either limit of its path of travel the controller is beyond a certain slow-speed position, and means for closing a circuit in shunt to either limit-switch operative only when said controller is in said slow-speed position.

8. In an electrically driven reciprocating mechanism, a driving motor, a controller for regulating the speed and direction of rotation thereof, limit-switches for causing the circuit through the motor to be interrupted if when the reciprocating device has reached a certain point in its path of travel the controller is beyond a certain slow-speed position, and means for closing a circuit in shunt to either limit-switch through the other limit-switch operative only when said controller is in said slow-speed position.

9. In an electrically driven reciprocating mechanism, a driving motor, a controller for regulating the speed and direction of rotation thereof, an electromagnetically operated switch for closing and opening the main motor circuit, limit-switches arranged to be opened when the reciprocating mechanism reaches a certain point in its path of travel in either direction, parallel connections from the controller through said limit switches to the actuating coil of said electromagnetic switch, and contacts on said controller which when the controller is in a slow-speed position complete the circuit through both of said parallel connections but which when said controller is beyond said position complete the circuit through only one of said parallel connections.

10. In an electrically driven reciprocating mechanism, a driving motor, a controller for regulating the speed and direction of rotation thereof, an electromagnetically operated switch for closing and opening the main motor circuit, limit-switches arranged to be opened when the reciprocating mechanism reaches a certain point in its path of travel in either direction, parallel circuits from the controller through said limit-switches to the actuating coil of said electromagnetic switch, and contacts on said controller which when the controller is in a slow-speed position complete the circuit to the actuating coil of the electromagnetic switch through both of said parallel circuits but which when said controller is beyond said position complete the circuit through only that parallel circuit in which is located the limit-switch which is opened by the reciprocating device in its movement in the direction corresponding to that position of the controller.

11. In an electrically driven reciprocating mechanism, a driving motor, a controller for regulating the speed and direction of rotation thereof, an electromagnetically operated switch for closing and opening the main motor circuit and having its actuating coil connected to said controller, limit-switches for interrupting the circuit through the actuating coil of the electromagnetic switch if when the reciprocating mechanism reaches a certain point in its path of travel in either direction the controller is beyond a certain slow-speed position, and means for closing a circuit in shunt to either limit-switch operative only when said controller is in said slow-speed position.

12. In an electrically driven reciprocating mechanism, a driving motor, a controller for regulating the speed and direction of rotation thereof, an electromagnetically operated switch for closing and opening the main motor circuit, limit-switches arranged to be opened when the reciprocating mechanism reaches a certain point in its path of travel in either direction, parallel circuits from the controller through said limit-switches to the actuating coil of said electromagnetic switch, and contacts on said controller which when the controller is in a slow-speed position for causing rotation of the motor in either direction connect both of said parallel circuits to the source but which when said controller is beyond said slow-speed position for either direction of rotation connect to the source only the parallel circuit in which is located the limit-switch which is opened by the movement of the reciprocating mechanism in the direction corresponding to that direction of rotation of said motor.

In witness whereof, I have hereunto set my hand this 26th day of November, 1907.

LEOPOLD JANISCH.

Witnesses:
JULIUS RUMLAND,
KARL MICEKEBEN.